United States Patent [19]

Kawai

[11] Patent Number: 5,717,316
[45] Date of Patent: Feb. 10, 1998

[54] MOTIVE POWER GENERATING APPARATUS UTILIZING ENERGY OF PERMANENT MAGNET

[75] Inventor: Teruo Kawai, Tokyo, Japan

[73] Assignee: Nihon Riken Co., Ltd., Tokyo, Japan

[21] Appl. No.: 800,279

[22] Filed: Feb. 13, 1997

[30] Foreign Application Priority Data

Jul. 15, 1996 [JP] Japan .................... 8-184959

[51] Int. Cl.$^6$ .................................... H02P 6/00
[52] U.S. Cl. .................... 322/46; 310/156; 310/49 R; 310/181; 318/498; 318/499
[58] Field of Search ................. 322/46, 10, 20; 310/181, 156, 269; 318/498, 499

[56] References Cited

U.S. PATENT DOCUMENTS

| | | | |
|---|---|---|---|
| 3,671,788 | 6/1972 | Knudson et al. | 310/156 |
| 4,306,164 | 12/1981 | Itoh et al. | 310/49 R |
| 4,583,015 | 4/1986 | Toshimitsu | 310/187 |
| 5,117,144 | 5/1992 | Torok | 310/269 |
| 5,130,595 | 7/1992 | Arora | 310/268 |
| 5,327,069 | 7/1994 | Radun et al. | 322/10 |
| 5,369,324 | 11/1994 | Saether | 310/49 R |
| 5,382,853 | 1/1995 | Von Der Heide et al. | 310/67 R |
| 5,488,287 | 1/1996 | Kemner et al. | 322/20 |
| 5,545,938 | 8/1996 | Mecrow | 310/156 |

Primary Examiner—Steven L. Stephan
Assistant Examiner—Nicholas Ponomarenko
Attorney, Agent, or Firm—Wenderoth, Lind & Ponack

[57] ABSTRACT

A motive power generating apparatus using magnetic flux from permanent magnets providing higher efficiency and torque is disclosed. An apparatus of one embodiment according to the present invention comprises a ring-shaped stator (10) formed of magnetic material, a rotor (20) including at least one permanent magnet (22a), and a current control circuit (40). The stator (10) further includes twelve stator poles (12) provided along the inner periphery thereof at intervals of fifteen degrees. Each of the stator poles (12) has a pole piece (12a) and a winding (14). The rotor (20) contains twelve sets of rotor poles (22) disposed around the outer periphery thereof corresponding to the above stator poles (12). Each of the rotor poles (22) has a permanent magnet (22a) and a pole piece (22b) arranged at the outer end portion of the same. An extending portion (22b1) is provided with each of the pole pieces (22b) at one tip end in rotational direction thereof. Each of the rotor poles (22) is attracted by an excited stator pole (12) in the opposite polarity to that of the corresponding rotor pole (22) positioned forward to cause a clockwise rotation to the rotor (20) since a magnetic flux is converged to the extending portion (22b1). Current direction in each of the windings (14) is alternated every fifteen degrees of rotation to change the polarity of each of the stator poles (12) so as to continue rotation of the rotor (20).

8 Claims, 8 Drawing Sheets

MOTIVE POWER GENERATING APPARATUS UTILIZING ENERGY OF PERMANENT MAGNET

BACKGROUND OF THE INVENTION

1. Field of the Invention

The present invention relates to a motive power generating apparatus utilizing magnetic energy of permanent magnet, specifically to a motive power generating apparatus providing higher energy conversion efficiency than those of the conventional electric motors by utilizing magnetic energy of a permanent magnet as well as magnetic energy of a electromagnet as input energy to be converted into motive power output.

2. Description of the Related Art

Various types of electric motors have been conventionally developed, which are designed to convert electric energy into mechanical force. What is common among those general electric motors is that electromagnets are employed as either stators or rotors, to which electric current is supplied from an external system. For example, in a typical induction motor configuration, a rotating magnetic field is generated by sequential change of a current Supply to a plurality of electromagnets disposed in the stator and a rotor of a shape such as a squirrel cage follows the rotating magnetic field to produce an output torque.

Various attempts have been made in improving an efficiency of such conventional electric motors by utilizing magnetic flux from a permanent magnet. Among those, U.S. Pat. No. 4,306,164 discloses a pulse motor capable of outputting continuous rotation by applying a pulsated energizing current. As shown in FIGS. 8(a) and (b), the pulse motor comprises four stators 100, 102, 104 and 106, stator yokes 140, 142 and 144, four rotors 110, 112, 114 and 116, excitation windings 130 and 132, a permanent magnet 120 and yokes 146, 148. Each of the stators 100, 102, 104, 106 and the rotors 110, 112, 114, 116 is equipped with eight salient poles PS and PR, respectively. The rotors 110, 112, 114, 116 are fixed to the shaft 150 in the stators 100, 102, 104, 106. The excitation windings 130 and 132 are supported by each pair of the stators 100, 102 and 104, 106. The permanent magnet 120 is secured between the rotors 112 and 114. The shaft 150 is supported by end plates 160 via bearings 162. The shaft 150 and the rotors 110, 112, 114 and 116, the permanent magnet 114, and the yokes 146, 148 secured thereto are installed in a hollow cylindrical housing 164. The salient poles PR of the rotors 110 and 114 are shifted circumferentially by ¼ pitch, i.e., 11.25° from those of the other rotors 112 and 116.

The excitation windings 130 and 132 of the pulse motor thus constructed are supplied with an excitation current. The direction of the excitation current is so changed that the path of the magnetic flux from the permanent magnet 120 is changed as shown below.

Rotor 110 N - - N
Rotor 112 - N N -
Rotor 114 S S - -
Rotor 116 - - S S

Symbol "-" means cancellation of the magnetic flux from the permanent magnet 120 by those of the excitation windings 130 and 132.

The rotors 110, 112, 114 and 116 are rotated by every ¼ pitch by the above controlled current.

A problem with the illustrated pulse motor is that the magnetic flux from the permanent magnet 120 is canceled by those of the excitation windings 130, 132 so as to control paths for the magnetic flux from the permanent magnet 120. It is because the above function wastes a portion of the magnetic energy from the permanent magnet 120 and the excitation windings 130, 132, thus all the magnetic energy is not utilized for driving the rotor. This is an obstacle for improving the efficiency of the electric motors.

SUMMARY OF THE INVENTION

An object of the present invention is to provide a motive power generating apparatus providing higher efficiency and torque by utilizing magnetic energy of a permanent magnet as well as magnetic energy of a electromagnet as input energy to be converted into motive power output.

To accomplish these and other objects of the invention, according to one aspect of the present invention, a motive power generating apparatus utilizing energy of a permanent magnet, comprises a stator having a stator core, a plurality of stator poles and a plurality of windings disposed around the respective stator poles, a rotor having a rotor core rotatably supported in the stator and a plurality of rotor poles arranged along the outer periphery of the rotor core, each of the rotor poles including a permanent magnet member arranged corresponding to the respective stator poles, the permanent magnet members arranged in such a manner that different polarities thereof are adjacent each other and a pole piece of magnetic material disposed on each of the permanent magnet members, the pole piece having an extension in a direction of rotation of the rotor core, and means for supplying electric current to the windings of the stator so that the adjacent stator poles are energized in opposite polarities. The electric current supplying means changes direction of the current supplied to the respective windings so as to alternate the polarity of each of the stator poles when the rotor poles face on the corresponding stator poles which have the opposite polarity, whereby magnetic energy of the permanent magnet members as well as magnetic energy of the stator poles by the electric current input by the electric current supplying means is converted into motive power output. Accordingly, each of the rotor poles is repelled by the stator pole situated backward in rotational direction of the rotor. At the same time, each of the rotor poles is attracted by an attracting force convergently affecting between the stator pole with an opposite polarity situated forward in rotational direction and the extending portion of the rotor pole to drive the rotor continuously. Thus, the rotor is driven by both the repelling and attracting force between the rotor poles and the stator poles.

According to another aspect of the present invention, a motive power generating apparatus comprises a stator having a stator core, a plurality of stator poles and a plurality of windings disposed around the respective stator poles, the stator poles sorted into a plurality of stator pole groups, each of the groups including adjacent two stator poles, a rotor having a rotor core rotatably supported in the stator and a plurality of rotor poles arranged along the outer periphery of the rotor core, each of the rotor poles defined to face the two adjacent stator poles, including a permanent magnet member arranged corresponding to the respective stator poles, the permanent magnet members arranged in such a manner that different polarities thereof are adjacent each other and a pole piece of magnetic material disposed on each of the permanent magnet members, the pole piece having an extension in a direction of rotation of the rotor core, and means for supplying electric current to the windings of the stator so that the stator poles in the same stator pole group have the same polarity and the adjacent stator pole groups are energized in opposite polarities. The electric current supplying means changes direction of the current supplied to the respective windings so as to alternate the polarity thereof when the rotor poles face on the corresponding stator pole groups which have the opposite polarity, whereby magnetic energy of the permanent magnet members as well as magnetic energy of the stator poles by the electric current input by the electric current supplying means is converted into motive power output. Accordingly, as described with respect to the preceding aspect of the present invention, each of the rotor poles is repelled by the stator pole situated backward in rotational direction of the rotor. At the same time, each of the rotor poles is attracted by an attracting force convergently affecting between the stator pole with an opposite polarity situated forward in rotational direction and the extending portion of the rotor pole to drive the rotor continuously. Thus, the rotor is driven by both the repelling and attracting force between the rotor poles and the stator poles.

Preferably the pole piece of the rotor pole has an outer peripheral length longer than the distance between the two adjacent stator poles or ranging the stator pole group including the two adjacent stator poles.

It is also preferable that the stator is substantially formed into a ring shape and the even-numbered stator poles are projectingly disposed along the inner peripheral portion thereof at equal intervals.

It is further preferable that the pole piece has an arc-shaped outer peripheral profile corresponding to the inner periphery of the stator pole.

In the motive power generating apparatus of the present invention, the rotor is driven by a magnetic attractive force applied by the stator poles of the stator as the extending portion is attracted toward an opposite pole formed at the stator pole. When the rotor poles of the rotor face on the stator poles or the stator pole groups of the stator, the polarities of the stator poles or the stator pole groups are changed into the opposite polarities so that the facing rotor pole and the stator pole or the stator pole group has the same polarity. Consequently, the rotor is continuously rotated as the rotor poles of the rotor are repelled by the same magnetic polarity of the stator poles or the stator pole groups of the stator and, at the same time, attracted by the other opposite poles of those positioned forward in a rotational direction of the rotor.

According to the above first aspect of the present invention, the longer length of the outer periphery of the rotor pole than the distance between the adjacent stator poles contributes to increase in torque because the rotor pole is driven by both the repelling force from the backward stator pole of the same polarity and the attracting force from the forward stator pole having the different polarity.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DESCRIPTION OF PREFERRED EMBODIMENTS

Figure 1:
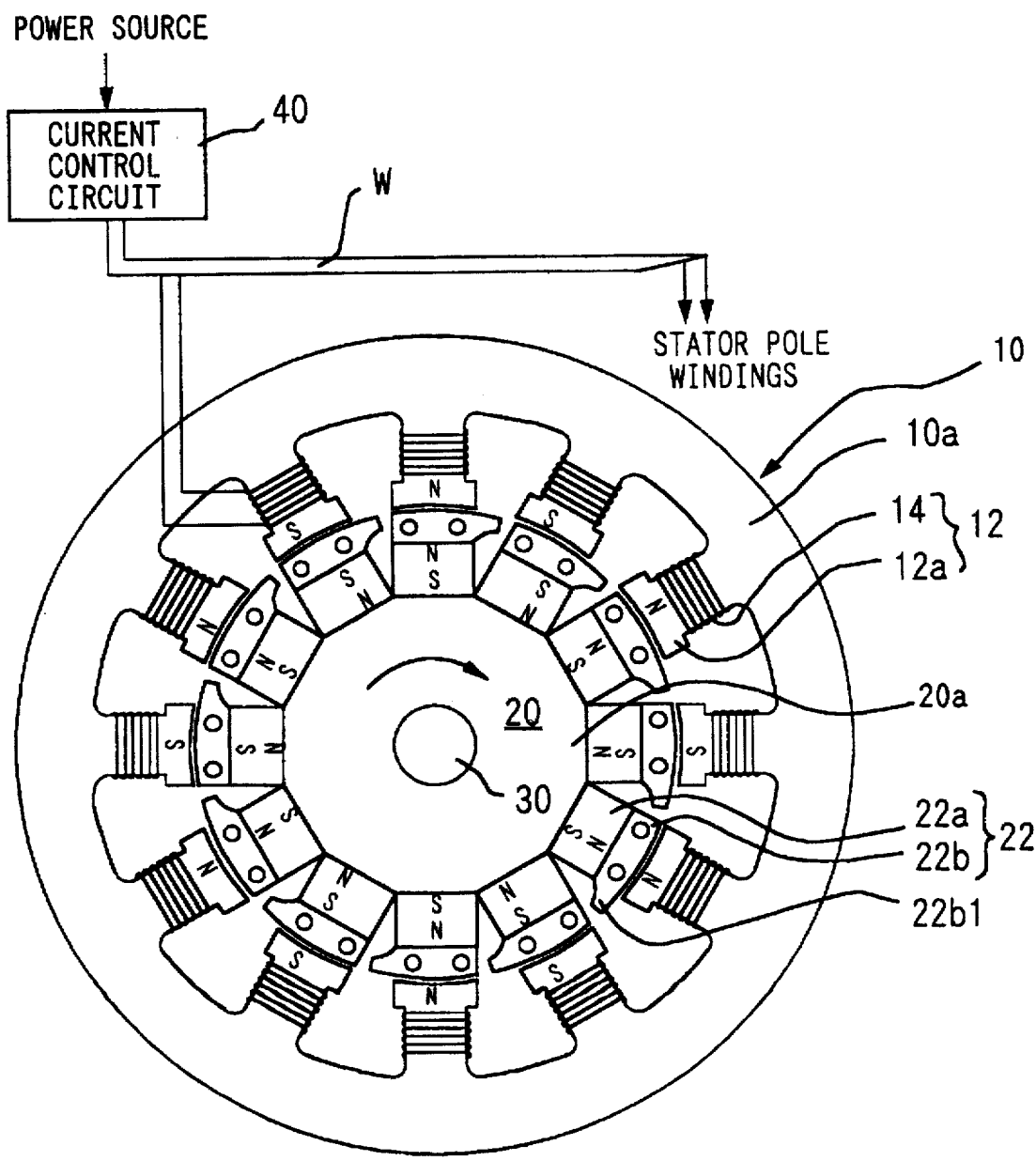
FIG. 1 is a schematic plan view of a motive power generating apparatus according to one embodiment of the present invention.

As shown in FIG. 1, a motive power generating apparatus according to one embodiment of the present invention includes a stator 10, a rotor 20 fixed to a shaft 30 positioned in the stator 10. The stator 10 further contains a ring-shaped stator core 10a formed of magnetic material. Twelve sets of stator poles 12 are arranged along the inner periphery of the stator core 10a at intervals of thirty (30) degrees. Each of the stator poles 12 is defined as a protruding portion in radial direction inwardly from the inner periphery of the ring-shaped stator core 10a. A winding 14 is provided with the respective stator poles 12 for energizing the same. The windings 14 are connected to a current control circuit 40. The direction and intensity of the current supplied to the windings 14 are appropriately controlled by the current control circuit 40. In this embodiment the current is so controlled that the adjacent stator poles 12 are energized in the opposite polarities. The current control circuit 40 also determines the timing of changing the current direction. Switching of the current may be achieved using switching devices such as a transistor, thyristor, or an electric relay and other control devices installed in the current control circuit 40. Material constituting the stator core 10a may be a magnetic material suitably employed for a magnetic core. The stator core 10a of the present embodiment has a laminated structure with 40 mm thickness.

Inside the ring-shaped stator 10 is provided a rotor 20. At the center of the stator 10 is arranged the shaft 30 for rotatably supporting the rotor 20. A rotor core 20a is a hub member fixed to the shaft 30 so that the rotor 20 is rotatably supported in the stator 10. The rotor core 20a has a cross section of a regular twelve-sided polygon since the rotor core 20a supports twelve rotor poles 22 corresponding to the stator poles disposed along the inner periphery of the stator 10. The rotor core 20a is preferably formed of nonferrous material for suppressing effect by a leakage flux. However, magnetic material may be also employed for the rotor core 20a. In this embodiment, the rotor core 20a is formed of carbon steel, type S45C standardized in JIS G 4051.

Twelve sets of rotor poles 22 are provided with the rotor core 20a at intervals of thirty (30) degrees in correspondence with the stator poles 12 disposed with the stator 10. Each of the rotor poles 22 includes a permanent magnet 22a and a pole piece 22b. The permanent magnets 22a having a shape of a rectangular prism, are disposed on the outer peripheral portion of the rotor core 20a. The pole piece 22b is formed of magnetic material and arranged at the outer end portion of the permanent magnet 22a so as to face the stator pole 12. The outer periphery of the pole piece 22b has a curved profile corresponding to the inner periphery of the stator poles 12. Each of the pole pieces 22b has a extending portion 22b1 at one end thereof in rotational direction of the rotor 20. This extending portion 22b1 provides an asymmetric figure with the rotor pole 22 against the facing stator pole 12 because the extending portion 22b1 of the pole piece 22b defines an extension from the side surface of the permanent magnet 22a. The extending portion 22b1 also has the functions of converging a magnetic flux in the rotor pole 22 arranged along the outer periphery of the rotor 20 between the permanent magnet 22a and the stator pole 12 to the extending portion 22b1 to increase magnetic flux density and of producing imbalance in distribution of a magnetic flux between the stator 12 and the rotor pole 22. Consequently, magnetic energy of the permanent magnets 22a as well as that of the stator poles 12 functioning as electromagnets to which electric current is supplied, is efficiently converted into motive power output. According to the above structure, the rotor 20 starts to rotate in such a direction that the extending portion 22b1 of the rotor pole 22 moves forward. In other words, the rotational direction of the rotor 22 is determined as directed by the extending portion 22b1 of the rotor pole 22.

Figure 2:
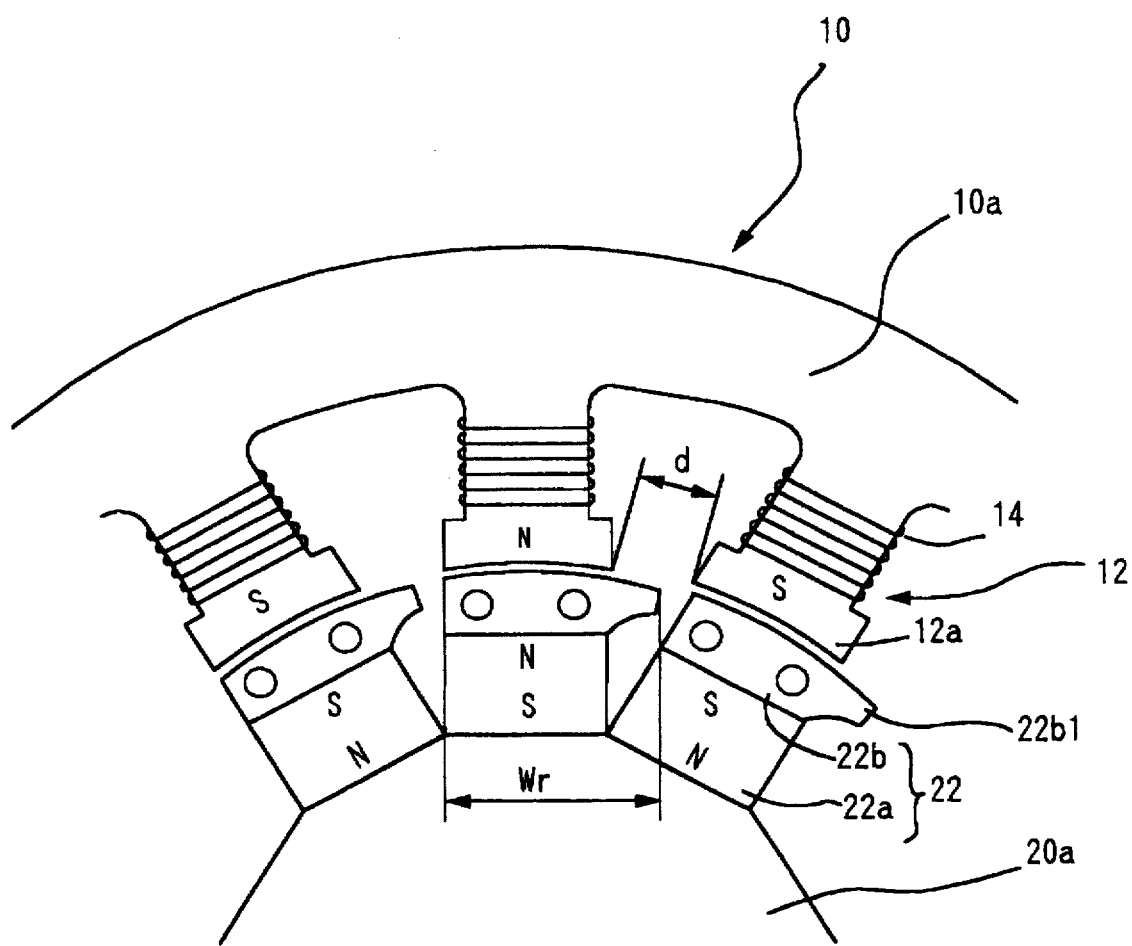
FIG. 2 is a magnified partial view of FIG. 1.

FIG. 2 shows a magnified plan view of a portion in which the stator and rotor poles 12, 22 are facing each other. An air-gap provided between the pole piece 22b of the rotor pole 22 and a tip end of the stator pole 12 is approximately 0.5 mm wide in this embodiment. Obviously, the smaller the air-gap becomes, the greater the efficiency and the torque of the apparatus grows. However, the width of the air-gap may be determined considering such factors as accuracy in manufacturing parts and/or assembly, and manufacturing cost.

As also shown in FIG. 2, it is preferable that a width Wr of the outer end portion of the pole piece 22b of the rotor piece 22 is set longer than a distance d between the tip end portions 12a of the adjacent stator poles 12. According to this configuration, a magnetic force of attracting or repelling is always applied to the pole piece 22b of the rotor pole 22 from either stator pole 12 arranged forward or backward in the rotational direction of the rotor 20. As a result, decrease in fluctuation of an output torque of the rotor 20, i.e., suppression of a cogging of the rotor 20 can be achieved.

Figure 3:
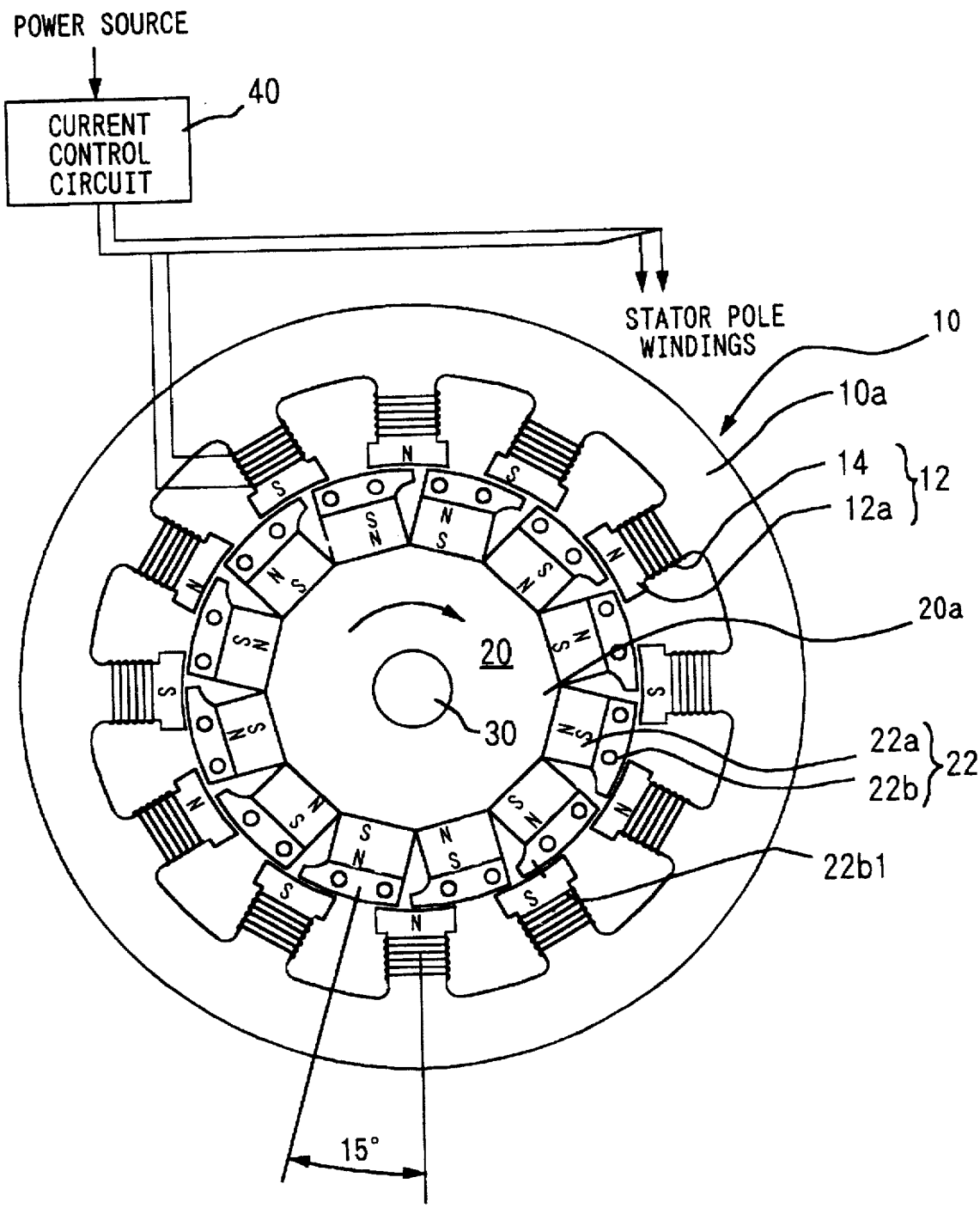
FIGS. 3 and 4 are schematic plan views of a motive power generating apparatus according to one embodiment of the present invention.
Figure 4:
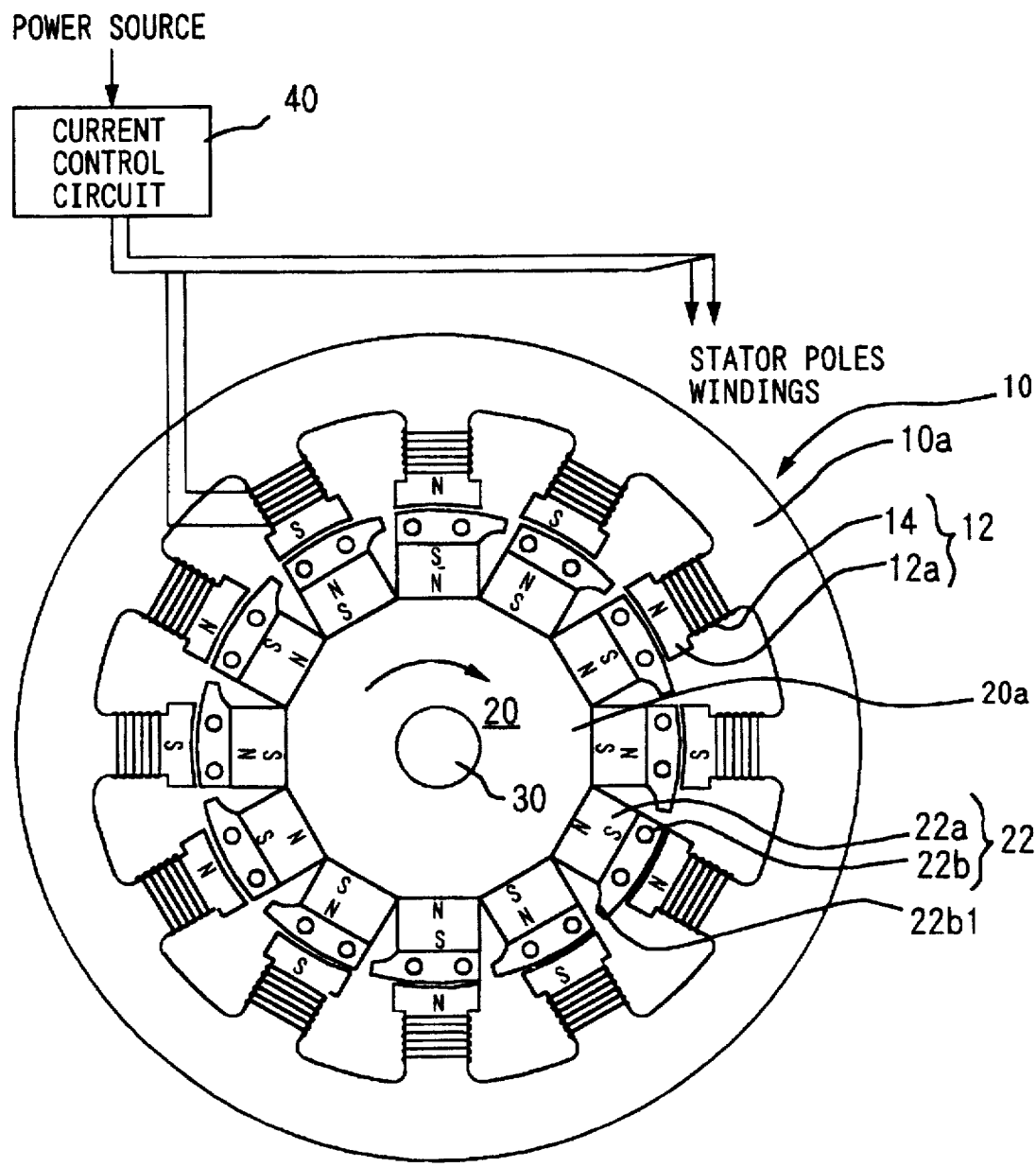

FIGS. 1, 3 and 4 illustrate function of the present embodiment of the invention. As seen in FIG. 1, each of the twelve sets of the rotor poles 22 is faced against the respective stator poles 12. Since the facing rotor pole 22 and the stator pole 22 have the same magnetic polarity, the repelling force is applied to between the both poles 22 and 12. Thus, the rotor 20 is in very unstable situation against the stator 10 in FIG. 1. Because of the extending portion 22b1 arranged at one end of the pole piece 22b in rotational direction of the rotor 20, a magnetic flux between the permanent magnet 22a and the adjacent stator pole 12, next to the facing stator pole 12 thereto, having an opposite polarity to that of the permanent magnet 22a, is converged to the extending portion 22b1 of the rotor pole 22 to attract the extending portion 22b1 toward the stator pole 12 situated forward in rotational direction of the rotor 20. Therefore, the rotor 20 starts to rotate clockwise as shown in FIG. 1 by an arrow.

In FIG. 3, each of the rotor poles 22 is positioned halfway between the adjacent stator poles 12 having the different polarities after the rotor 20 is rotated by fifteen (15) degrees clockwise. Each of the rotor poles 22 is attracted by an attracting force convergently affecting between the stator pole 12 with an opposite polarity situated forward in rotational direction and the extending portion 22b1 of the rotor pole 22 to drive the rotor 20 clockwise continuously. At the same time, each of the rotor poles 22 is repelled by the stator pole 12 situated backward in rotational direction of the rotor 20. The rotor 20 is driven by both the attracting and repelling force between the rotor poles 22 and the stator poles 12.

After the rotor 20 is rotated clockwise further by fifteen (15) degrees, each of the pole pieces 22b of the rotor poles 22 is faced against the respective stator poles 12 as shown in FIG. 4. In this situation, the pole piece 22b of the rotor pole 22 and the stator pole 12 which are confronting each other have different polarities, respectively, thus the attracting force is applied to between the facing stator and rotor poles 12 and 22. In other words, the situation seen in FIG. 4 is stable, which does not cause the rotor 20 to rotate. In the present embodiment, a direction of current supplied to each of the windings 14 is alternated to change the magnetic polarity of each of the stator poles 12 and reproduce the unstable situation as shown in FIG. 1. Rotation of the rotor 20 is thus continued.

Time period for a stator pole 12 is formulated as follows:
ON duration=T/P; a duty ratio of which is 1:1,
where T is a time period for a revolution of the rotor 20, and P is a number of the stator poles 12.

Direction of the current through the windings 14 is alternated for every excitation of the stator pole 12 according to the timings formulated above, so as to change the polarity of the same. Non-contact position detecting devices such as a photo-interrupter may be used for determining the ON/OFF time periods of the excitation current since the time periods of excitation depend on relative positions between the rotor 20 and the stator 10.

A motive power generating apparatus according to another embodiment of the present invention is hereinafter described referring to FIGS. 5 to 7.

Figure 5:
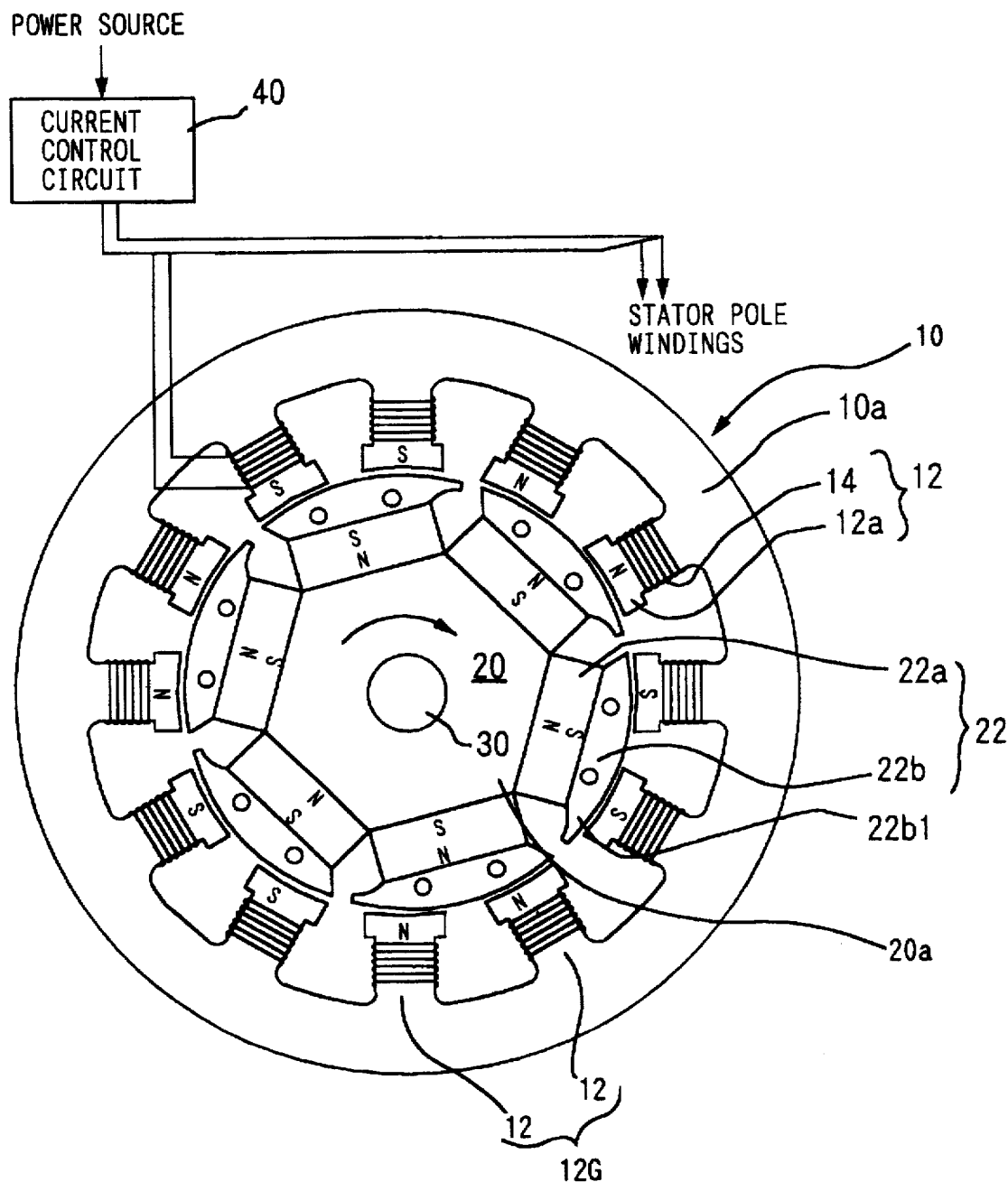
FIGS. 5 to 7 are schematic plan views of a motive power generating apparatus according to another embodiment of the present invention.

A stator 10 of the apparatus in FIG. 5 has substantially an equivalent construction to that of the stator 10 in the above first embodiment. However, arrangement of the polarities of the stator poles 12 is different from that of the preceding embodiment. In the present embodiment, a pair of adjacent stator poles 12, 12 constituting a stator pole group 12G have the same polarity. A rotor 20 is rotatably supported by a shaft 30 fixed to a rotor core 20a integrally arranged at the center of the rotor 20. The rotor core 20a of the rotor 20 is defined to have a hexagonal plan view. Six sets of rotor poles 22 are disposed on the six sides of the rotor core 20a at intervals of sixty (60) degrees, respectively. Each of the rotor poles 22 corresponds to each of six sets of the stator pole groups 12G. The respective rotor poles 22 include a permanent magnet 22a and a pole piece 22b. The permanent magnet is shaped into a rectangular prism. The pole piece 22b is formed of magnetic material and arranged at the outer end portion of the permanent magnet 22a so as to face the stator poles 12. Each of the pole pieces 22b is formed to range the adjacent stator poles 12 and has an extending portion 22b1 at one end thereof in rotational direction of the rotor 20. This extending portion 22b1 provides an asymmetric figure with the pole piece 22b against the facing stator pole 12 as described in the first embodiment.

Figure 6:
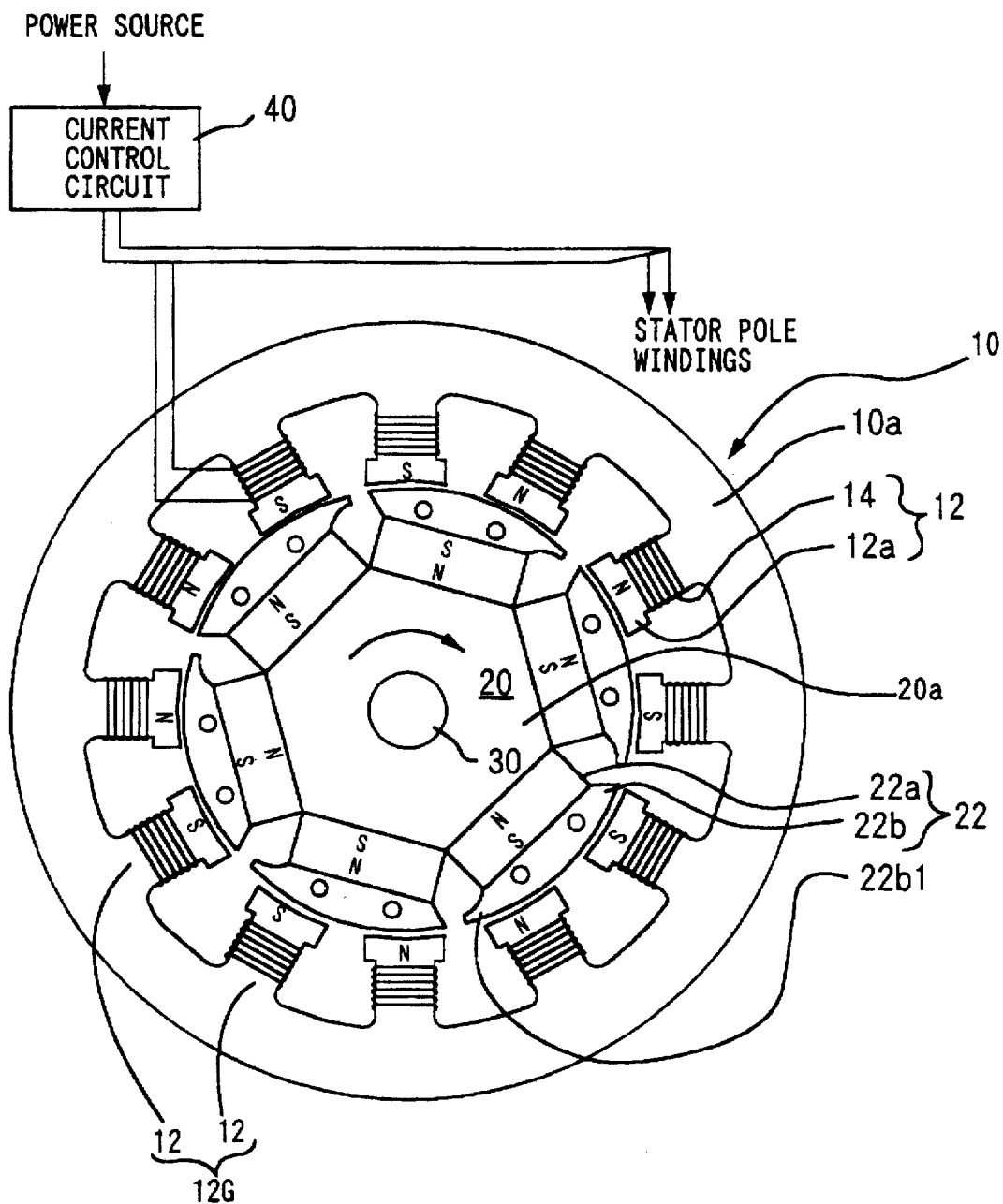
Figure 7:
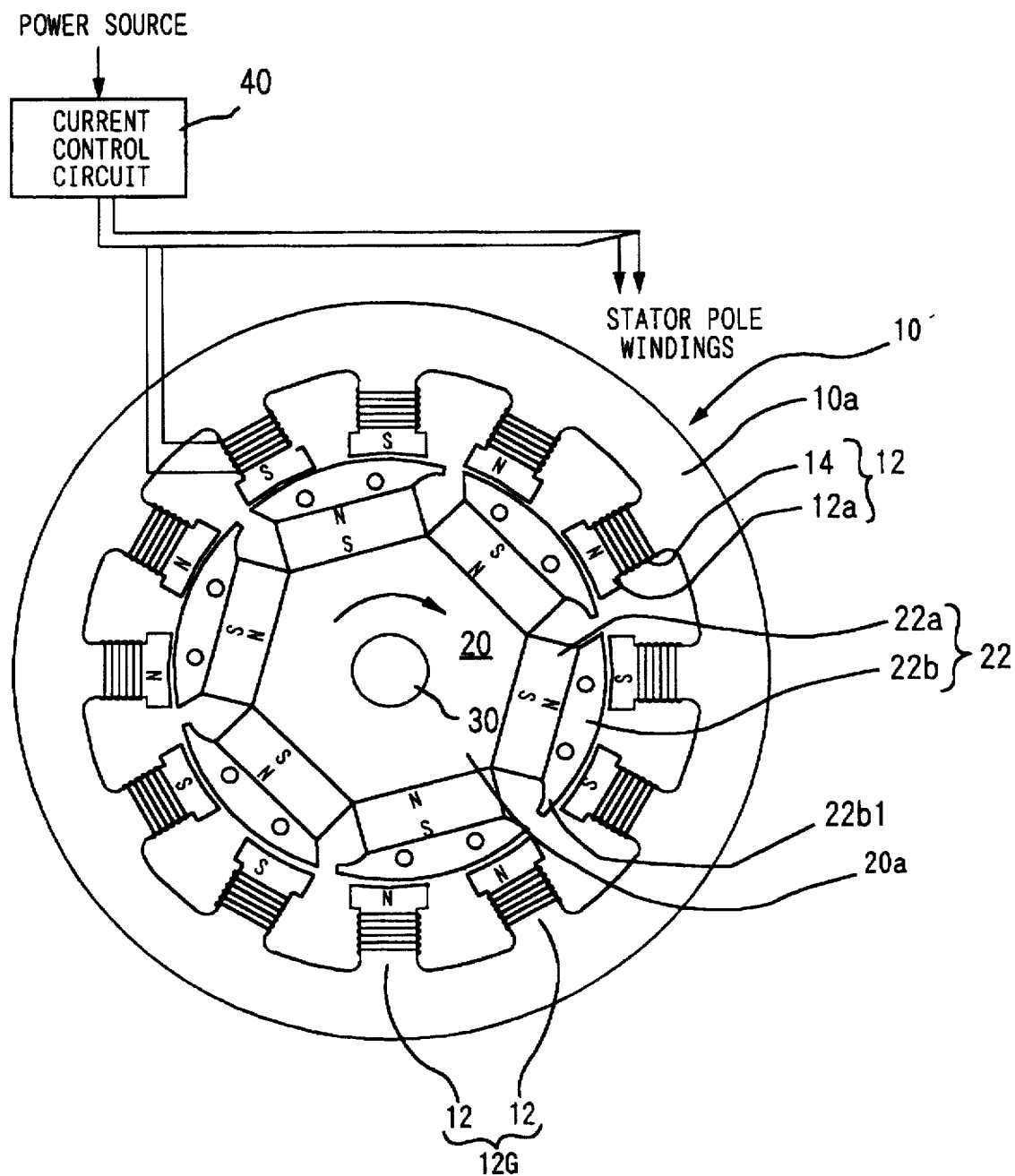
Figure 8:
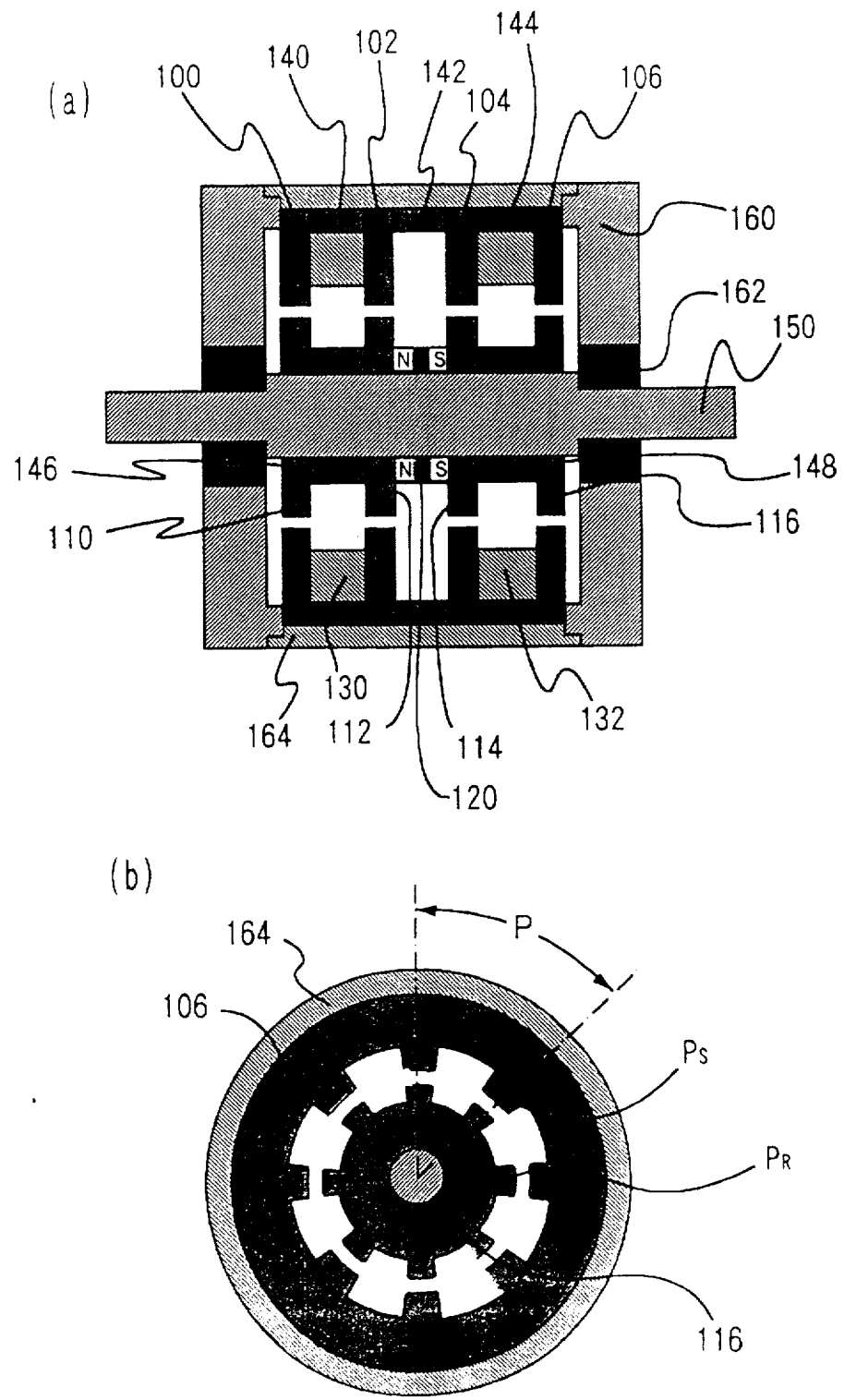
FIGS. 8(a) and (b) are exploded views of a conventional electric motor.

Referring to FIGS. 5 to 7, hereinafter described functions of the motive power generating apparatus according to the present embodiment.

As shown in FIG. 5, each of the rotor poles 22 faces the stator pole groups 12G, respectively. Each pair of the facing rotor pole 22 and the stator poles 12 of the stator pole group 12G has the same polarity. Therefore, as described with respect to the first embodiment, the rotor 20 in FIG. 5 starts to rotate clockwise, i.e., in the direction directed by the extending portion 22b1 of the rotor pole 22.

FIG. 6 shows the rotor poles 22 positioned halfway between the adjacent stator pole groups 12G, as ranging over the adjacent stator poles 12 having opposite polarities each other. Each of the rotor poles 22 is attracted by a magnetic flux converged between the extending portion 22b1 of the pole piece 22b and the stator pole 12 positioned forward in rotational direction of the rotor 20 to rotate clockwise continuously. In the meantime, the pole piece 22b is repelled by the stator pole 12 of the same polarity, situated backward in rotational direction of the rotor 20 to force the rotor 20 to move clockwise.

As shown in FIG. 7, when the rotor 20 rotates clockwise further by thirty (30) degrees, each of the rotor pole 22 comes to face a pair of stator poles 12, i.e., a stator pole group 12G. The stator poles 12 contained in the same stator pole group 12G are excited to have the opposite polarities to that of the rotor pole 22. Therefore, in FIG. 7, the rotor pole 22 and the stator poles 12 facing thereto are attracted each other by the magnetic flux therebetween. In other words, FIG. 7 shows a stable condition with respect to a positional relationship between the rotor 20 and the stator 10. In the present embodiment, the current direction of each of the windings 14 is changed so that a polarity of each of the stator pole group 12G is alternated in the instance shown in FIG. 7. By this operation, the stable condition of FIG. 7 is changed into the aforementioned unstable condition illustrated in FIG. 5 to have the rotor 20 rotated continuously.

Operation of the present embodiment of the invention is substantially equal to that of the first embodiment having six stator poles instead of the original twelve poles. However, in this embodiment, each slot between the adjacent stator pole groups 12G is narrower than those in the modification of the first embodiment having six stator poles 12, in which the number of the stator poles 12 is simply decreased from twelve to six. Thus, fluctuation in output torque of the rotor 20 is able to be suppressed compared with the modification. Furthermore, as seen from FIGS. 5 to 7, since a permanent magnet 22a of higher strength such as a larger permanent magnet in size, can be employed to increase emerging magnetic flux therefrom, more output torque of the rotor 20 is to be obtained.

While the present invention has been discussed in terms of the preferred embodiments, the present invention should be implemented in various fashions with incorporating modifications of the disclosed embodiments in addition, omission or modification of the detailed construction, without departing from the principle of the invention. Therefore, the present invention should be understood to include all embodiments encompassed within the spirit of the invention set out in the appended claims.

What is claimed is:

1. Motive power generating apparatus utilizing energy of permanent magnet, comprising:

a stator having a stator core, a plurality of stator poles and a plurality of windings disposed around the respective stator poles;

a rotor having a rotor core rotatably supported in said stator and a plurality of rotor poles arranged along the outer periphery of the rotor core, each said rotor poles including a permanent magnet member arranged corresponding to said respective stator poles, said permanent magnet members arranged in such a manner that different polarities thereof are adjacent each other and a pole piece of magnetic material disposed on each of the permanent magnet members, said pole piece having an extension in a direction of rotation of said rotor core; and means for supplying electric current to the windings of the stator so that the adjacent stator poles are energized in opposite polarities, said electric current supplying means changing direction of the current supplied to the respective windings so as to alternate the polarity of each said stator poles when the rotor poles face on the corresponding stator poles which have the opposite polarity, whereby magnetic energy of said permanent magnet members as well as magnetic energy of said stator poles by the electric current input by said electric current supplying means is converted into motive power output.

2. Motive power generating apparatus as set forth in claim 1, wherein said pole piece of the rotor pole has an outer peripheral length longer than the distance between the two adjacent stator poles.

3. Motive power generating apparatus as set forth in claim 1, wherein said stator is substantially formed into a ring shape and the even-numbered stator poles are projectingly disposed along the inner peripheral portion thereof at equal intervals.

4. Motive power generating apparatus as set forth in claim 1, wherein each said pole piece has an arc-shaped outer peripheral profile corresponding to the inner periphery of the stator pole.

5. Motive power generating apparatus utilizing energy of permanent magnet, comprising:

a stator having a stator core, a plurality of stator poles and a plurality of windings disposed around the respective stator poles, said stator poles sorted into a plurality of stator pole groups, each said group including adjacent two stator poles;

a rotor having a rotor core rotatably supported in said stator and a plurality of rotor poles arranged along the outer periphery of the rotor core, each said rotor poles defined to face the two adjacent stator poles, including a permanent magnet member arranged corresponding to said respective stator poles, said permanent magnet members arranged in such a manner that different polarities thereof are adjacent each other and a pole piece of magnetic material disposed on each of the permanent magnet members, said pole piece having an extension in a direction of rotation of said rotor core; and means for supplying electric current to the windings of the stator so that the stator poles in the same stator pole group have the same polarity and the adjacent stator pole groups are energized in opposite polarities, said electric current supplying means changing direction of the current supplied to the respective windings so as to alternate the polarity thereof when the rotor poles face on the corresponding stator pole groups which have the opposite polarity, whereby magnetic energy of said permanent magnet members as well as magnetic energy of said stator poles by the electric current input by said electric current supplying means is converted into motive power output.

6. Motive power generating apparatus as set forth in claim 5, wherein said pole piece of the rotor pole has an outer peripheral length ranging the stator pole group including the two adjacent stator poles.

7. Motive power generating apparatus as set forth in claim 5, wherein said stator is substantially formed into a ring shape and the even-numbered stator poles are projectingly disposed along the inner peripheral portion thereof at equal intervals.

8. Motive power generating apparatus as set forth in claim 5, wherein said pole piece has an arc-shaped outer peripheral profile corresponding to the inner periphery of the stator pole.

* * * * *